United States Patent
Holmes

(10) Patent No.: US 7,698,650 B2
(45) Date of Patent: Apr. 13, 2010

(54) COMPUTERIZED ACTION TOOL FOR MANAGING PRINT PARAMETERS, QUEUING ACTIONS AND ARCHIVING ACTIONS FOR A DOCUMENT OUTPUT MANAGEMENT SYSTEM

(75) Inventor: Alix A. Holmes, Costa Mesa, CA (US)

(73) Assignee: Xerox Corporation, Norwalk, CT (US)

( * ) Notice: Subject to any disclaimer, the term of this patent is extended or adjusted under 35 U.S.C. 154(b) by 782 days.

(21) Appl. No.: 11/154,389

(22) Filed: Jun. 16, 2005

(65) Prior Publication Data

US 2006/0285868 A1 Dec. 21, 2006

(51) Int. Cl.
*G06F 3/00* (2006.01)
*G06F 9/00* (2006.01)
*G06F 17/00* (2006.01)

(52) U.S. Cl. .................. 715/762; 715/763; 715/764; 715/765

(58) Field of Classification Search ............... 715/779, 715/762, 763, 764; 358/452, 1.12, 403
See application file for complete search history.

(56) References Cited

U.S. PATENT DOCUMENTS

| | | | | |
|---|---|---|---|---|
| 4,460,975 | A * | 7/1984 | Torkelsen et al. | 715/209 |
| 5,341,293 | A | 8/1994 | Vertelney et al. | 715/530 |
| 5,689,626 | A | 11/1997 | Conley | 358/1.18 |
| 5,740,455 | A | 4/1998 | Pavley et al. | 715/515 |
| 5,873,659 | A * | 2/1999 | Edwards et al. | 400/61 |
| 5,898,434 | A | 4/1999 | Small et al. | 715/810 |
| 5,978,477 | A * | 11/1999 | Hull et al. | 358/403 |
| 6,003,011 | A | 12/1999 | Sarin et al. | 705/9 |
| 6,212,577 | B1 | 4/2001 | Stern et al. | 719/329 |
| 6,344,859 | B1 * | 2/2002 | Alimpich et al. | 715/762 |
| 6,396,594 | B1 * | 5/2002 | French et al. | 358/1.18 |
| 6,535,930 | B2 | 3/2003 | Stern et al. | 719/329 |
| 6,687,776 | B2 | 2/2004 | Reilly | 710/104 |
| 6,704,118 | B1 * | 3/2004 | Hull et al. | 358/1.15 |
| 6,810,136 | B2 * | 10/2004 | Stern et al. | 382/123 |
| 7,200,613 | B2 * | 4/2007 | Schlonski et al. | 707/104.1 |
| 2001/0018715 | A1 | 8/2001 | Stern et al. | 719/313 |
| 2001/0043362 | A1 * | 11/2001 | Hull et al. | 358/1.15 |
| 2002/0135792 | A1 * | 9/2002 | Sommer et al. | 358/1.13 |
| 2002/0181013 | A1 * | 12/2002 | Dunlap | 358/1.15 |
| 2003/0005097 | A1 * | 1/2003 | Barnard et al. | 709/223 |
| 2004/0036900 | A1 * | 2/2004 | Bruce | 358/1.12 |
| 2004/0080786 | A1 * | 4/2004 | Hull et al. | 358/1.16 |
| 2004/0099166 | A1 * | 5/2004 | Blom et al. | 101/483 |
| 2004/0160629 | A1 * | 8/2004 | Hull et al. | 358/1.15 |
| 2005/0012952 | A1 * | 1/2005 | Woo | 358/1.14 |
| 2005/0210408 | A1 * | 9/2005 | Baranda | 715/810 |
| 2006/0082813 | A1 * | 4/2006 | Martin et al. | 358/1.15 |
| 2006/0193006 | A1 * | 8/2006 | Lawrence et al. | 358/1.16 |
| 2007/0113164 | A1 * | 5/2007 | Hansen et al. | 715/500 |

\* cited by examiner

*Primary Examiner*—Tadesse Hailu
*Assistant Examiner*—Anita D Chaudhuri
(74) *Attorney, Agent, or Firm*—Alix, Yale & Ristas, LLP

(57) ABSTRACT

Disclosed herein is a computer system which includes a plurality of objects stored in a memory, a plurality of actions such as printing actions stored in the memory, and an action tool. Application of the action tool executes a subset of the plurality of actions on a subset of the plurality of objects. A method of outputting computerized objects by identifying a plurality of objects to be printed or otherwise manipulated, selecting an action tool which includes multiple actions and applying the action tool to the identified objects also is disclosed. The system and method of the invention are particularly useful for printing sets of documents or other files.

3 Claims, 8 Drawing Sheets

US 7,698,650 B2

COMPUTERIZED ACTION TOOL FOR MANAGING PRINT PARAMETERS, QUEUING ACTIONS AND ARCHIVING ACTIONS FOR A DOCUMENT OUTPUT MANAGEMENT SYSTEM

TECHNICAL FIELD

The embodiments disclosed herein relate to a computerized action tool and methods of customizing and employing the action tool.

BACKGROUND

In computerized graphical user interfaces, the user may want to perform the same set of manipulations or changes to several objects, such as files or documents. Using current computer systems and software, in some cases the user will select multiple objects and then apply a single action to all of the objects simultaneously. In other cases, the user will select a single object and apply a series or set of actions to that object. For example, in printing a single document, a user will typically specify a set of print parameters for the document at the time the print command is entered, or will use the set of default print settings. In managing e-mail, a user may highlight a set of messages and subsequently execute a "move to" command which results in the movement of all of the check-marked messages to a different folder. Only one action can be performed at a time and the collection of items to be moved generally are within a single mailbox or folder.

U.S. Pat. No. 5,341,293 is directed to a system having a plurality of user interface elements for finding and manipulating data within a document. Elements can be compounded together to cause a combination of tasks to be performed within a single document by activating one element.

U.S. Pat. No. 6,212,577 is directed to a method and apparatus for interacting with an application program using drag and drop type functionality. An item can be dragged from a first area on the screen which is controlled by a first process to a second area on the screen which is controlled by a second process. The second process may negotiate with the first process to provide certain data types. Based upon these data types, the second process will determine a list of actions in hierarchical fashion which may be performed on data. Such actions include printing and sending e-mail. The processes and actions are pre-defined. The actions are applied, for example, when the objects are moved into and out of a container.

Computer software known as Adobe® PhotoShop® uses a "magic wand" to edit documents or files. The wand is used to select a portion of a document which will be acted upon by subsequent commands or actions using conventional buttons and menu choices. For example, when the document is a digital photograph, the magic wand can be used to select contiguous or non-contiguous areas of a particular color range, such as to reduce red-eye or enhance the colors of a sunset. The wand does not perform the editing or any action other than selecting elements to be manipulated.

SUMMARY

One embodiment described herein is a document output management system comprising a plurality of printing actions stored in a memory, and an action tool which is accessible through an action tool user interface. When applied, the action tool executes a subset of the plurality of printing actions on at least one computerized object.

Typically, a plurality of computerized objects are acted upon by the action tool. The computerized objects usually are documents or other files. The printing actions often include printing parameters and/or queuing instructions.

In some cases, the action tool can be customized by a user. Often, the subset of the plurality of printing actions is executed in series. Sometimes, the action tool is applied to an individual object using a single user command. Often, the action tool is applied to a plurality of selected objects using a single user command. The action tool frequently is part of a set of action tools. In some cases, the action tool is a wand.

Another embodiment is a method of outputting computerized objects, comprising identifying a plurality of computerized objects to be printed, selecting an action tool which includes multiple printing actions, and applying the action tool to the identified computerized objects. In some cases, the action tool is customized by linking a particular set of printing actions to a particular action tool. Linking sometimes includes choosing the set of printing actions from a drop down menu. The customized action tool can be saved for future use. The action tool typically is applied using a single user command. The action tool often is selected from a group of action tools. The computerized objects frequently are documents and applying the action tool includes printing the documents.

Yet another embodiment is a computer system comprising a plurality of objects stored in a memory, a plurality of actions stored in the memory, and an action tool which is configured to execute a subset of the plurality of actions on a subset of the plurality of objects. Often, at least two actions are executed on at least two objects.

A further embodiment is a method of manipulating computerized objects comprising identifying a plurality of computerized objects to be manipulated, selecting an action tool which includes multiple actions, and applying the action tool to the identified computerized objects. Another embodiment is a method of manipulating computerized objects comprising customizing a printing action tool by linking multiple printing actions to the tool, identifying a plurality of computerized documents to be manipulated, and applying the customized printing action tool to the identified computerized documents. The customized printing action tool usually is saved for future use.

DETAILED DESCRIPTION

Figure 1:
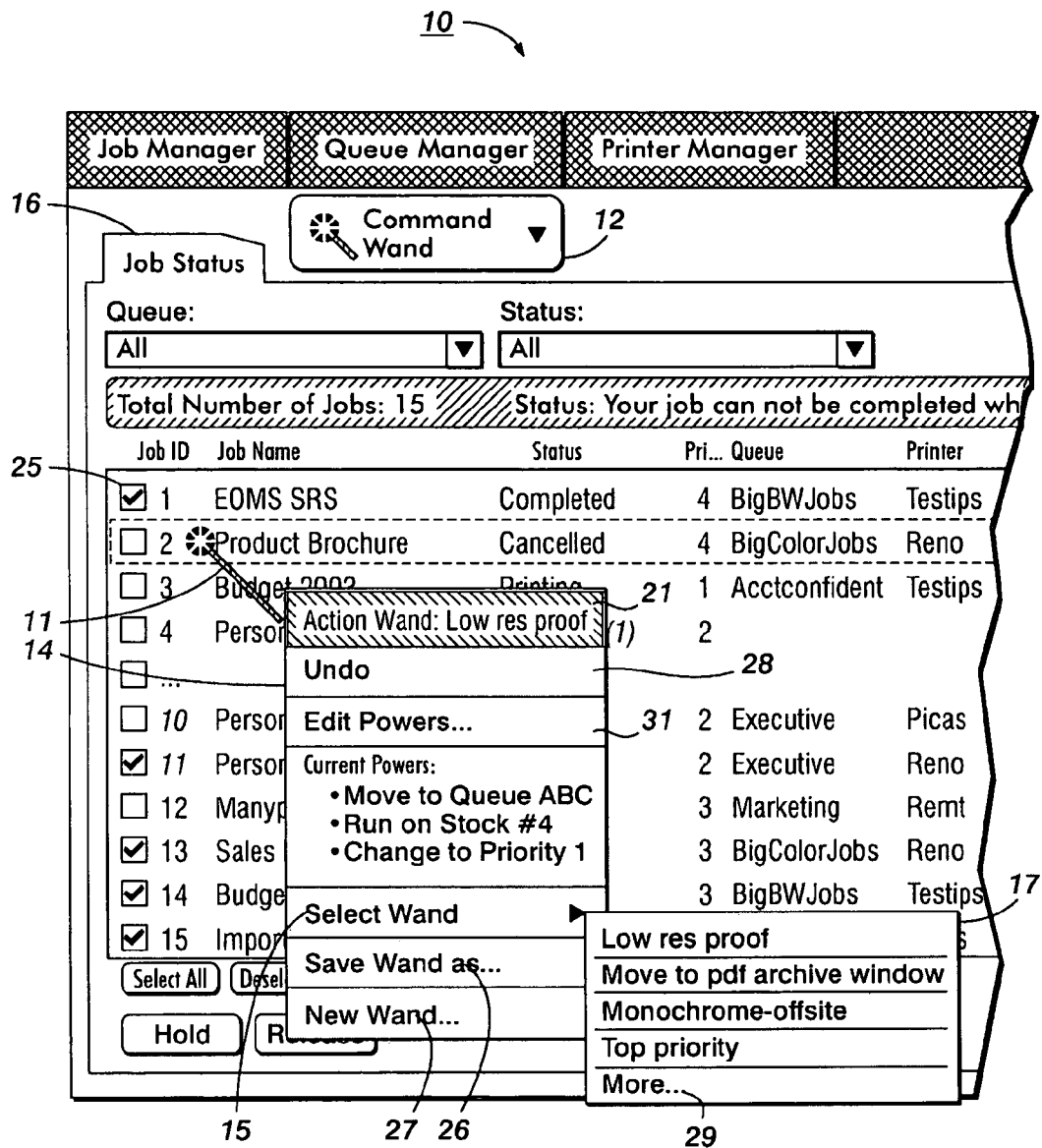
FIG. 1 shows an example of a computer screen as it appears when using an action tool such as an action wand.

In one embodiment, an action tool, such as an action wand or the like, is customized or loaded with a plurality of actions that are to be performed on a set of files or documents. Using the action tool, one or more actions can be bestowed upon one or more files or documents as a result of a single user command. Typically, multiple actions are applied to a plurality of files. The single user command typically is effected by a single keystroke, mouse click, touch on a touch screen, or other single input device selection, or by a short series of keystrokes, mouse clicks, or other input device selections. Commands are typically provided in a set of drop down menus or command buttons. The action tool therefore provides efficiency advantages over prior known techniques for performing multiple actions on documents. In another embodiment, pre-made user interface tools are applied to a set of documents or other files. Each pre-made tool is designed to perform a plurality of actions on the set of documents or files.

As used herein, an "object" is a file or document. An "action" is a computerized subroutine which results in manipulation of an object and/or a change to the object's properties. For example, manipulations can be changes in the location, file type, configuration or status of a document, such as moving, printing, sending, transforming (e.g. to another file format such as PDF to PostScript®), copying or deleting. General examples of properties which may be changed include file identification information, custom properties such as bookmarks, form fields and fonts, and document library properties. Specific examples of properties include changing access rights and displaying hidden text.

An "action tool" is a graphical user interface tool that allows a user to apply one or more actions, or a series of actions, to objects. The action tool can be customized, giving the user the ability to collect and configure the actions and properties associated with the use of the action tool. A set of configured actions is retained until the user changes tools or modes. An action tool typically is activated by selection of an icon, image or menu item on a computer screen which is associated with a set of user configurable computerized subroutines which are run on a computer's central processing unit. The action tool 'mode' may be represented graphically for example by changing the cursor appearance. An action tool collects and configures the actions associated with the use of the graphical element. The action tool is accessed and edited by a toolbar button, dialog window menu commands and selections, and/or context menu commands and selections.

An "action wand" or "wand" is one type of graphical representation of an action tool. Other graphical representations also can be used. "Applying" a wand means executing one or more actions associated with a particular wand on one or more files or documents.

The term "document" is used to denote a document in any state, including (but not limited to) when viewed on a computer display, when formatted as a print file ready for printing, and when in hardcopy form. The state the document is in at any point in the description depends on the context. Also, a "document" may include text, graphics or mixed representations. "Files" are documents or other stored sets of data. A document plus the processing instructions for the document may, for example, constitute a print file. For the purposes of discussion herein, the term "printer" as used herein shall include all different types of printer and output devices, both hard (physical printer) and soft (Web server), or other hardcopy or document rendering apparatus and devices.

Figure 2:
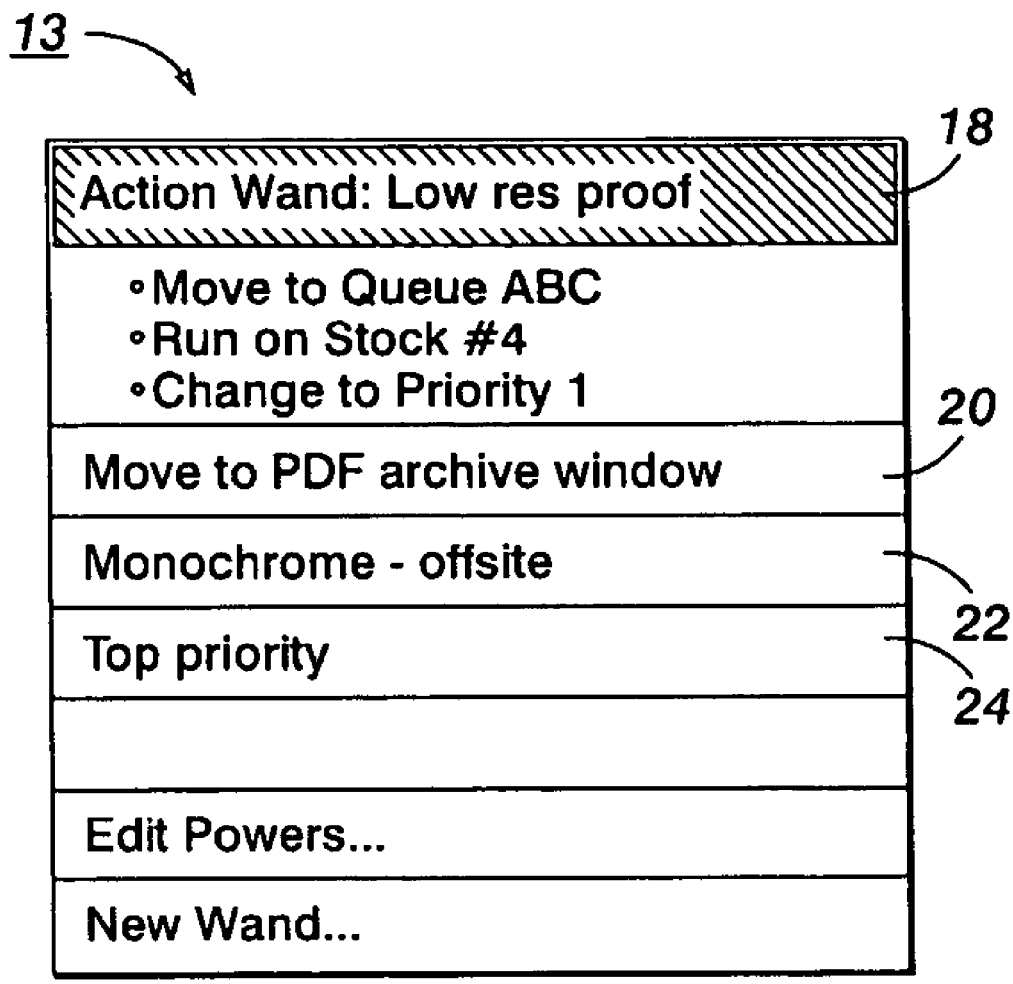
FIG. 2 shows an exemplary drop down menu as it appears when selecting and applying an action wand.

Referring now to the drawings and first to FIG. 1, an example of a computer screen display which enables use of an action tool is shown and is generally designated as 10. The particular type of action tool shown is an action wand, which is designated as 11. The display 10 includes a "Command Wand" button 12 which, when selected by a left mouse click or another suitable selection technique, provides a drop down menu 13, shown in FIG. 2, which lists existing wands and some key commands and propori. The most recently used wand is the default selection for the button, so if the user clicks the button and does not drop down the menu, the user gets the most recently used wand. Other wands are typically listed, in order of most recent use, at the top of the menu. A desired wand can be selected from the drop down menu 13, causing the cursor to take on the shape of an action wand 11. The menu 13 usually is sufficiently small that the underlying screen display 16, shown in FIG. 1, remains visible and is capable of being read, marked, etc. When the underlying screen display 16 is a job status summary or another type of list, the action wand 11 can then be applied to objects one at a time by clicking the wand over an object name or other entry on the screen display 16. If, for example, a set of files is to be printed in low resolution and a single proof copy is desired, the "low res proof" wand 18 is selected and applied to the files individually or as a group. If the set of files is to be archived, the "move to pdf archive workflow" wand 20 is selected. This wand might (1) create a pdf file of a saved job, (2) move the pdf document to the appropriate archive folder and (3) change the retention period of the original job to 5 minutes so it does not take up space in the file system. If the set of files is to be printed off-site in black and white, the "monochrome offsite" wand 22 is selected. If the set of files is to be printed immediately, the "top priority" wand 24 is selected. After use of all wands 11 is completed, the most recently used wand can be deselected by clicking on the Command Wand button 12, or in some cases entering a custom keystroke combination, thereby changing the cursor back to its original form. Other techniques to deselect the tool could be to press the Esc key or add a command such as "Drop the wand" to the drop down menu 13 or a context menu 14, shown in FIG. 1.

If the user wants to apply a particular wand which already exists to a group of objects using a single click, the group of objects can be selected by filling in the check box 25 for each object in the group using the graphical user interface for the underlying screen display 16. After both the objects and the action wand 11 have been selected, the action wand 11 can then be applied to all of the objects in the group by clicking on any check box in the group, or in some applications, at any location along a line which has a checked box. Group selection may be useful, for example, when a large number of objects are to be acted upon by a particular wand. After use of the wand 11, the check boxes 25 may or may not remain filled in depending upon what software application is being used in connection with the underlying screen display 16.

As is shown in FIG. 1, if a suitable wand does not already exist, a user may access the context menu 14 by, for example, right clicking on the Command Wand toolbar button 12. The context menu 14 usually is sufficiently small that the underlying screen display 16 remains visible and is capable of being read, marked, etc. The context menu 14 is a pop-up menu which provides various options, including creating, saving, revising, selecting, applying and undoing action wands. To choose an existing wand, the wand is selected with a mouse click or the like in order that its name appears in the top box 21 of the context menu 14. If the user rolls over the "select wand" menu option 15, a window 17 containing a list of currently stored wands cascades off of the context menu 14. A complete list can be accessed by clicking on the "More . . . " menu option at 29. The user can select one of the existing wands by clicking on it, and then apply it by clicking over an object. In order to save a wand with a new name, (a likely scenario is to edit the original wand slightly to create the new wands), the "Save wand as . . . " command is selected at 26. In order to cancel the last action(s) of a wand 11, an "Undo" command is included at 28. This command will cancel the reversible actions of the most recent use of a wand. In some cases, the user will create a new wand by selecting the "New Wand . . . " menu option at 27, or edit an existing wand by selecting the "Edit Powers . . . " menu option at 31, both of which are described below in further detail. When the user has chosen the desired wand, it is applied using a mouse click over the appropriate file name in a list, which usually is highlighted. Other suitable application techniques also can be used.

Figure 3:
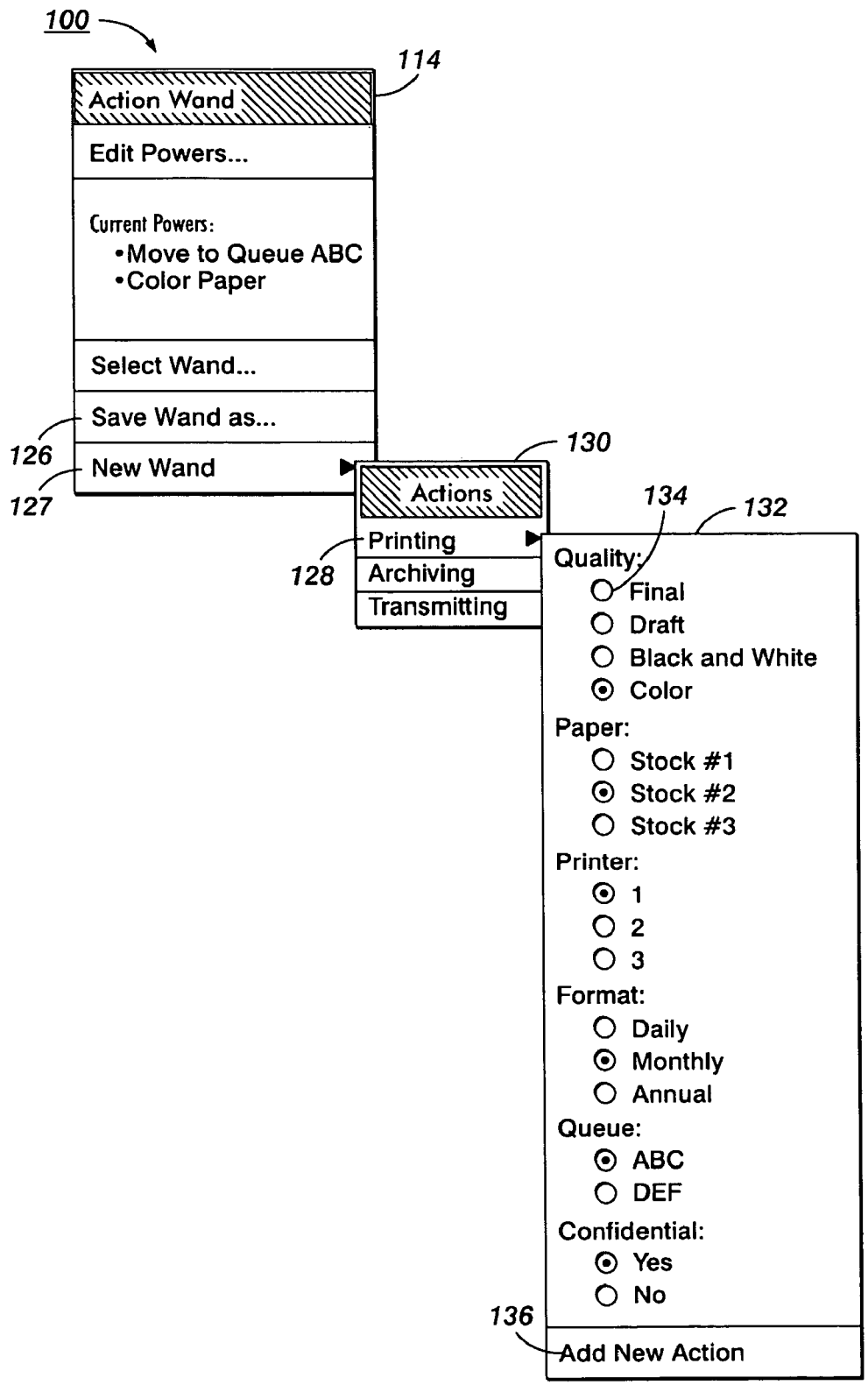
FIG. 3 shows an exemplary series of drop down menus as they appear when creating a new action wand.

FIG. 3 shows an exemplary set of drop down menus to be used when a new wand is being created according to one embodiment. The set of menus is generally designated as 100. The "New Wand" option in the action wand menu 114 is selected. The "New Wand" selection at 127 cascades to a list of common wand types as shown in menu 130. The wand type then cascades to a set of options and settings specific to that type/category. The user can select one or more of various categories of actions to be implemented on the documents or files, including but not limited to printing, archiving and transmitting files. When the action of printing is selected at 128, a print command menu 132 appears, listing a variety of commonly used printing commands that can be selected by selecting the desired option buttons 134. Check boxes can be used in place of option buttons when more then one item in a particular category can be selected. Non-limiting examples of print commands include (1) draft, final, black and white, and color commands; (2) stock #1, #2 or #3 paper commands; (3) printer 1, printer 2 and printer 3 commands; (4) daily, monthly and annual format commands, (5) queue ABC or DEF commands, and (6) non-confidential or confidential print job commands. The user may, for example, select color, paper stock #2, printer 1, queue ABC, confidential. Another option could be to add a new command to the menu by selecting "Add New Action" at 136. Commands and actions are usually chosen from those that already exist in the interface. In some cases, however, a user might have custom scripting done for their print business and the actions of the scripts can be incorporated into the wand. Selection choices in an archiving menu might be, for example, format to, save as, content indexing (for later key word search), access rights, encryption, keep for XX time period, post to web, etc. After all of the necessary parameters have been entered on each applicable actions menu, the wand is stored by clicking on the "Save Wand as" command at 126 and entering a wand name.

Figure 4:
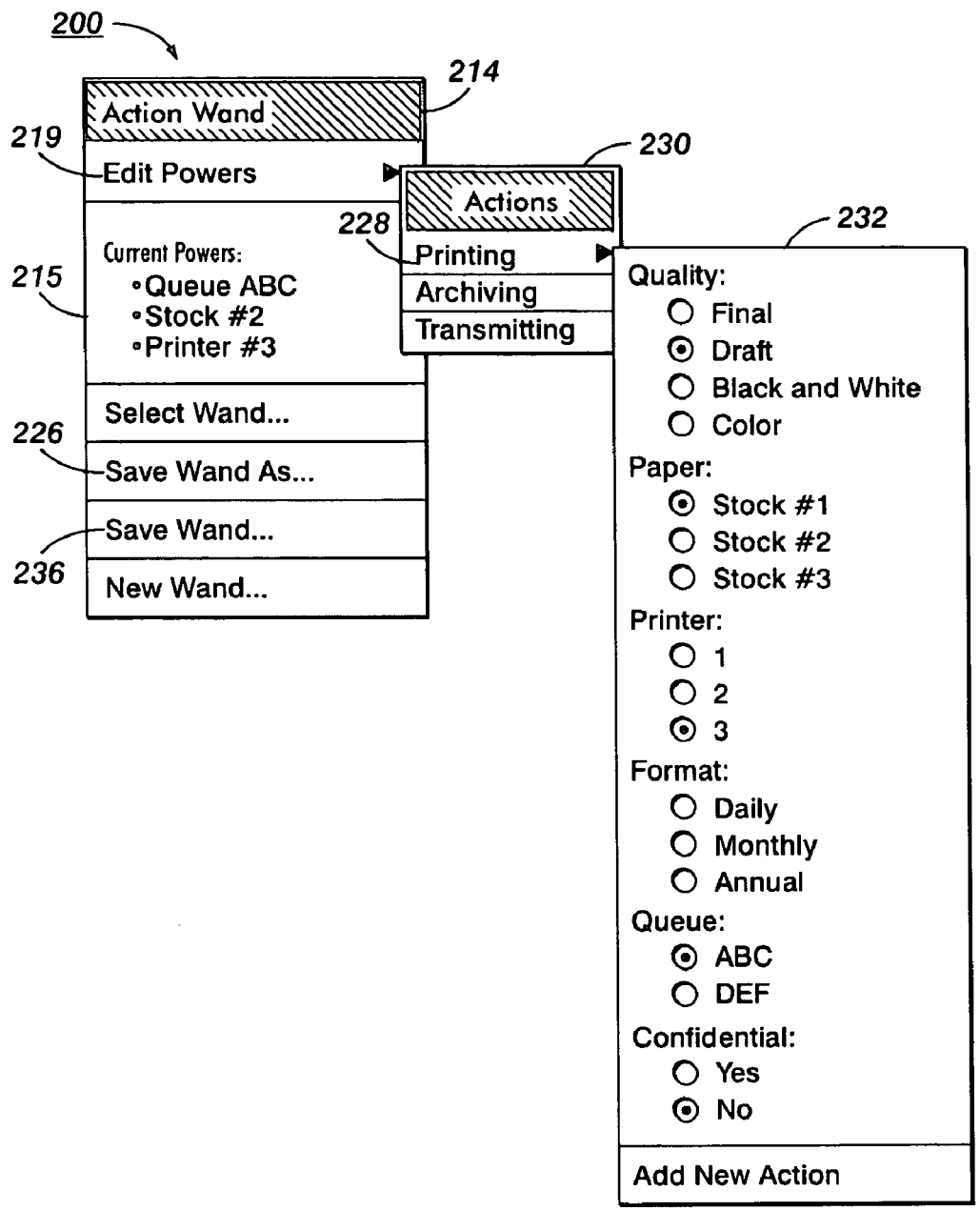
FIG. 4 shows an exemplary series of drop down menus as they appear when revising an existing action wand.

FIG. 4 shows an exemplary set 200 of cascading menus to be used when the powers of an existing wand are to be edited. In action wand menu 214, a list of the current powers of the most recently used wand are shown at 215. If the user wishes to edit the powers, he or she clicks on "edit powers" at 219 and the menu 230 cascades. If, for example, the printing powers are to be changed, the user clicks on "printing" at 228 and a menu 232 appears with the currently selected printing commands marked. The user can then use the mouse to add and/or delete commands by filling or emptying the option buttons. Check boxes can be used in place of option buttons, where appropriate. For example, in order to edit a wand to run a print job on paper stock #1 in draft form, the "Stock #2" command can be unmarked and the "Stock #1" box can be marked. Furthermore, the "draft" box can be marked. The edited wand can be stored under the old name by clicking "Save Wand" at 236 or under a new name by clicking "Save Wand As" at 226, in which case the prior version of the wand remains stored under the old name.

Figure 5:
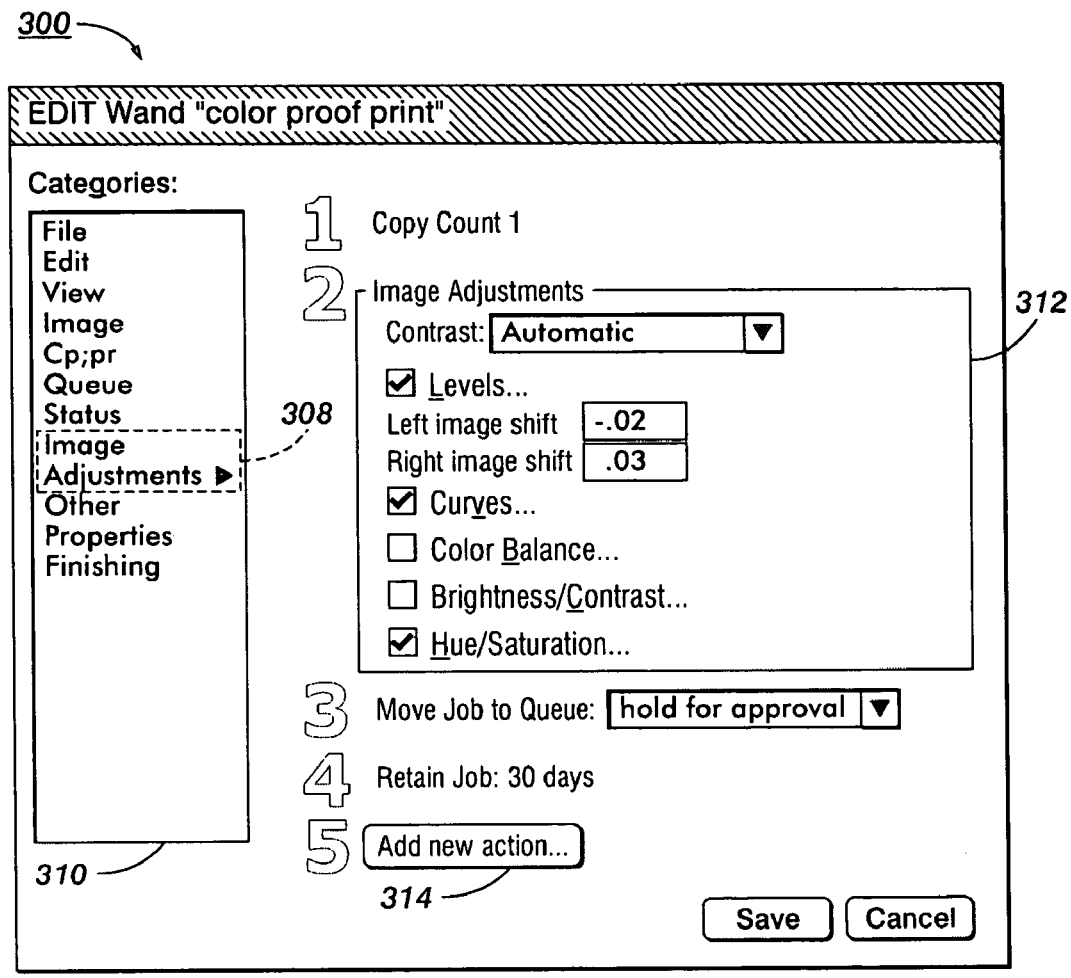
FIG. 5 shows another example of a computer screen as it appears when editing or adding new actions to an action wand.

FIG. 5 shows another example of a dialog window for editing wand powers. In this example, a wand saved as "color proof print" can be edited by opening an edit wand window 300 from an action wand drop down menu or the like and selecting an "image adjustments" menu option 308 in a categories window 310. An image adjustments window 312 provides for adjustments to contrast, including levels, curves, color balance, brightness and hue. Queuing options, job retention options, etc. can also be included as editable options in the edit wand window 300. By clicking an "Add new action" button 314, the user can select from a menu of other commands and actions that are in the interface by clicking on and thereby selecting particular commands or actions.

Figure 6:
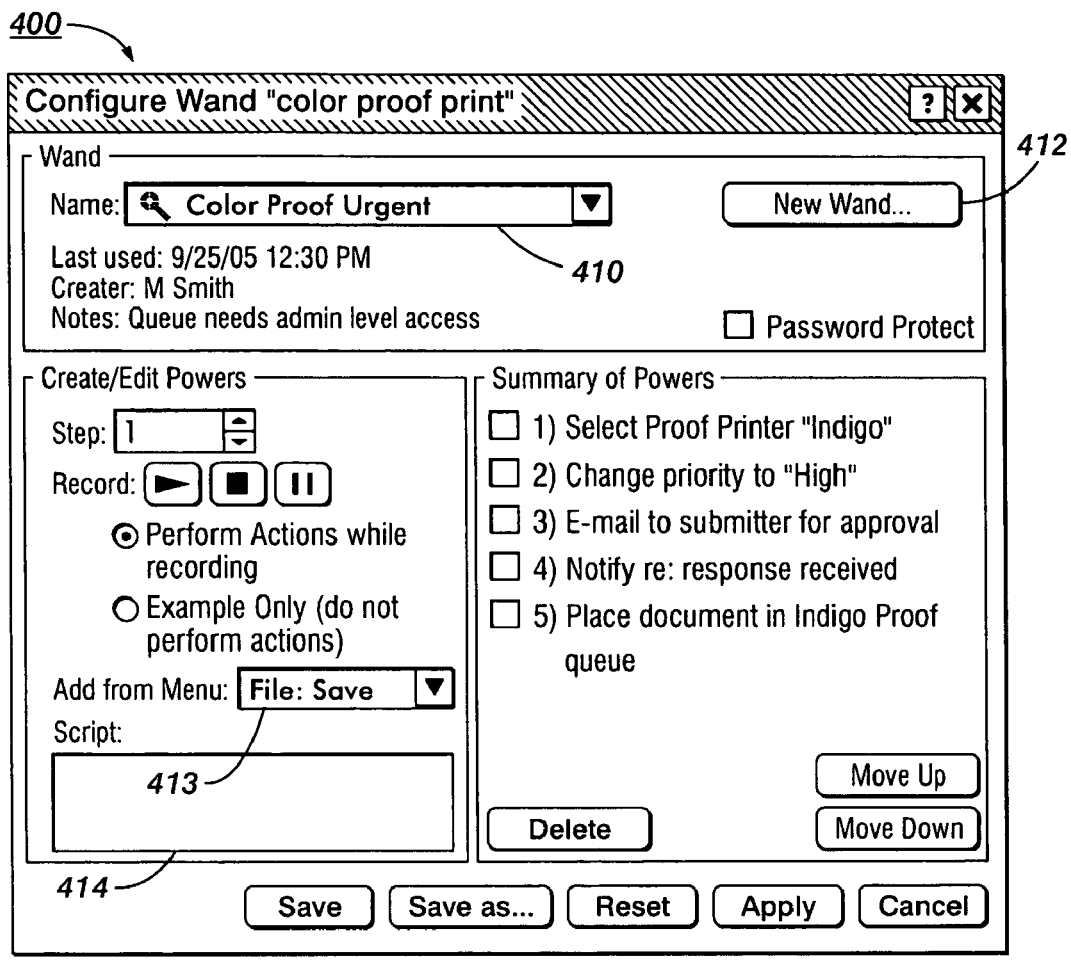
FIG. 6 is a further example of a computer screen as it appears when editing or creating a wand.

FIG. 6 depicts another wand configuration window 400 for editing an existing wand or configuring a new wand. The user can select an existing wand from a "Name" box 410 or can create a new wand by clicking on a "New Wand" button 412. If a wand is already in use and "Edit Powers" was already selected from a context menu, the current wand is automatically selected. When editing an existing wand, the user can add steps either by recording one or more actions in the manner of a conventional macro or by choosing steps from an application file menu. Action steps can be reordered or deleted. Another option is to use scripting at 414, which may be useful when an administrator is setting up wands for other users.

Figure 7:
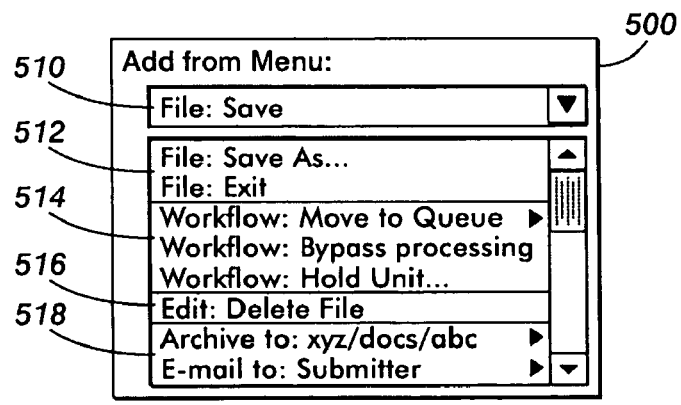
FIG. 7 is an example of a drop down box showing a context menu of user commands.

FIG. 7 shows an "Add from Menu" drop down menu 500 which can be included to provide convenient access to recently used commands and/or commonly used menu choices. This window can be opened by mouse clicking on the "Add from Menu" box which is shown in FIG. 6 as 413. Commands which appear in drop down menu 500 can include, for example, a "Save" command at 510, a "Save As . . . " command at 512, workflow management commands at 514, edit commands at 516, and transmitting commands, including, for example, archiving and e-mailing, at 518.

Figure 8:
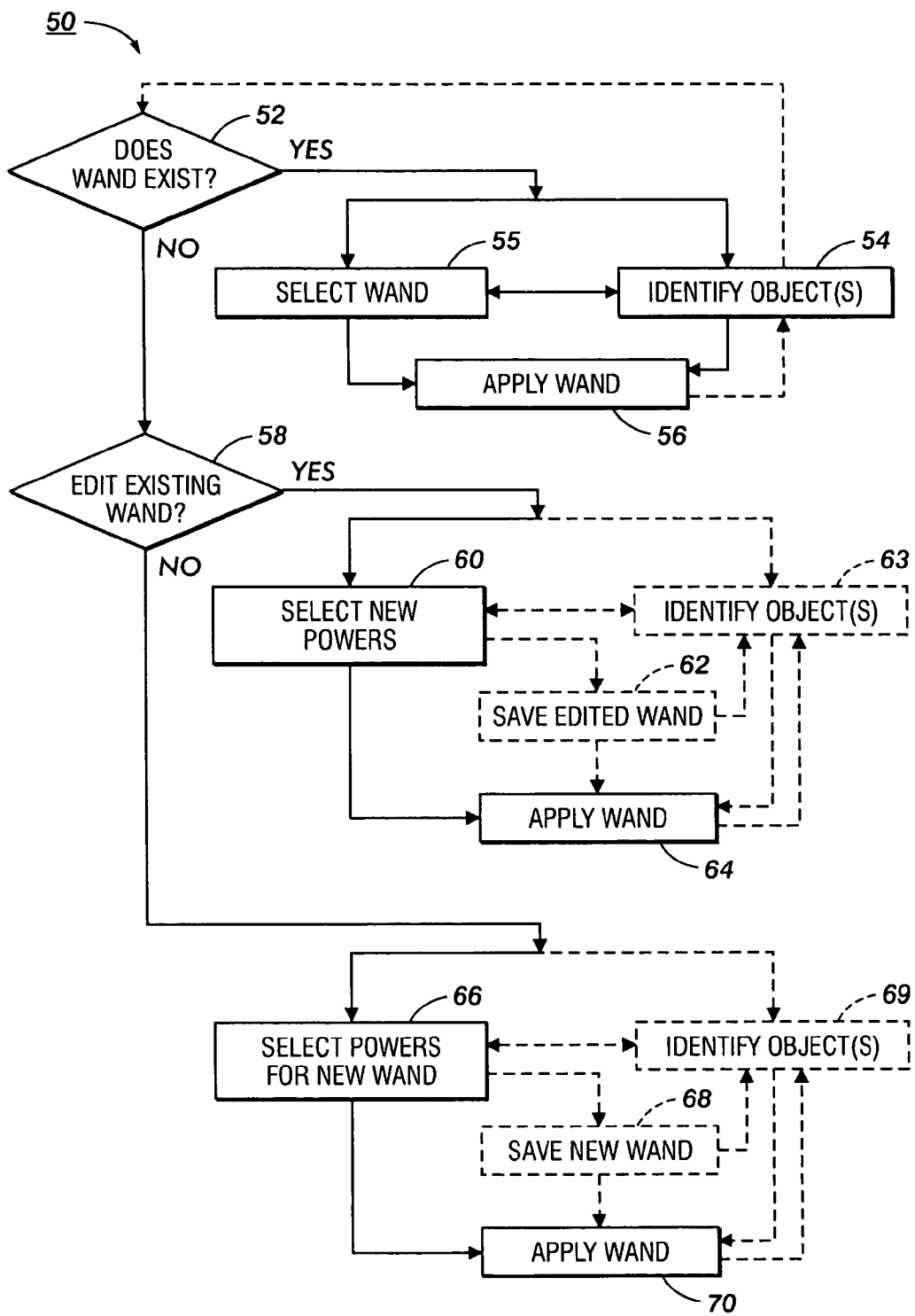
FIG. 8 is a process flow diagram showing a process in which an action wand is created, edited and/or used.

FIG. 8 is a process flow diagram for creating a customized wand and is designated as 50. A determination is made at 52 as to whether a suitable action wand currently exists. If it does, the wand is selected at 55 and objects to be acted on, such as files or documents, are identified at 54. Wand selection at 55 can take place before or after identification of objects at 54. While the determination regarding a suitable wand is usually made at 52 before objects are identified at 54, the determination at 52 alternatively can take place after objects are identified at 55. After both identification of one or more objects at 55 and selection of a wand at 54, the selected wand is applied at 56. If the wand is applied separately to each object, the loop between identifying an object at 54 and applying the wand at 56 is repeated until the wand has been applied to all the relevant objects. When the wand is applied separately to each object, selection of an object usually involves placing the cursor over the selected object and application of the wand involves clicking the cursor.

If the desired wand does not exist, a suitable wand is constructed. To construct a wand, a determination is made at 58 as to whether an existing wand can be edited or whether an entirely new wand is to be created. If an existing wand is to be edited, the desired powers are selected at 60 and are optionally are saved as part of the wand either under the old name or under a new name at 62. Objects are identified at 63 either individually or as a group (unless they were previously identified for this wand at 54), and the wand is applied at 64.

If an entirely new wand is created, the appropriate powers are input at 66 and are usually saved at 68. Objects are identified at 69 before or after the new wand is created. The new wand is then applied at 70.

In the above scenarios, if a wand is repeatedly applied to different individual objects, the objects usually are identified after the wand has been selected. If the wand is applied collectively to a group of objects, the objects in the group can be identified either before or after the wand is selected, but are usually identified before the wand is selected.

Figure 9:
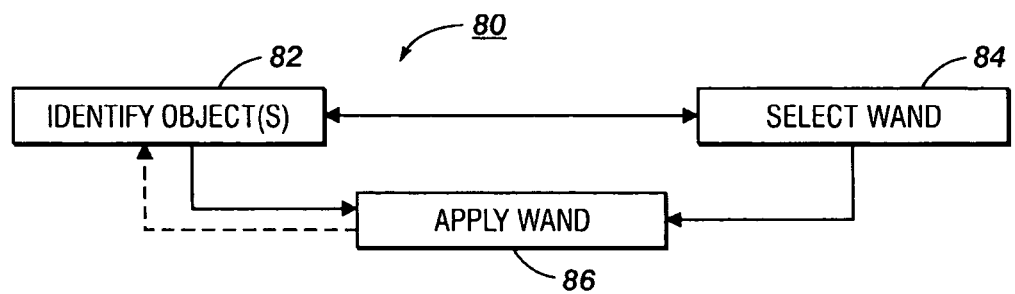
FIG. 9 is a process flow diagram showing a process in which a pre-programmed action wand is selected, one or more objects are selected, and the wand is applied.

FIG. 9 is a process flow diagram for an embodiment in which computer software has a set of pre-programmed action wands which can be used to perform multiple actions on multiple objects. In this process, which is designated as 80, one or more objects are selected at 82 and the desired wand is selected at 84, with its multiple powers typically being displayed on the screen. Selection of the wand at 84 optionally can occur before identification of the objects at 82. The wand is applied at 86. If objects are individually identified, the wand is applied once to each object. If objects are identified as a group, the wand can applied once to the entire group.

The user interface tool is particularly useful in the context of printing and archiving because various sets of printing parameters can be programmed conveniently into separate tools and then different tools can be applied to different sets of documents. Improved efficiencies are particularly evident when some of the documents are in different folders than others. For example, all print jobs can be listed on the computer screen and then the operator can select a first set of documents to which a first wand is to be applied, a second set of documents to which a second wand is to be applied, etc.

Figure 10:
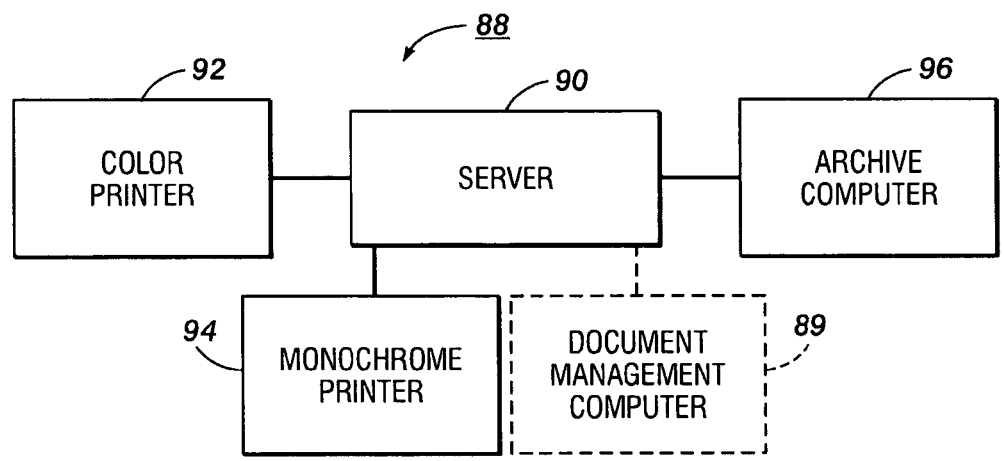
FIG. 10 depicts hardware involved in customizing and using action tools such as action wands.

A typical hardware arrangement for document management involving printing and archiving is shown in FIG. 10. The overall system is designated as 88. A server 90 is connected to a color printer 92, a monochrome printer 94, an archive computer 96, and optionally also to a document management computer 89. Software which includes an action tool such as an action wand can be run on the document management computer 89 or on the server 90. As wands are applied to sets of documents, they can be printed on the desired printer in the desired order and/or sent to the archive.

The user interface tool can be used for file management within a program such as Microsoft Windows Explorer. For example, a wand could be customized to (a) change the color of a folder, (b) set specific security parameters, (c) compress the folder contents, and (d) move the items in the folder to a particular archive location. Another context in which the user interface tool would be particularly useful is in managing e-mail. Rather than performing a single action on a set of files in a single folder, the tool can be used to perform multiple actions on multiple documents in multiple folders.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A document output management system, comprising:
a plurality of print parameters and queuing actions stored in a memory of a first computer, and
an action tool which can be customized and resaved by a user and is accessible through an action tool user interface on the first computer or a second computer, the action tool being activated by selection of an icon on a computer screen using a single user command, the action tool linking a particular subset of a larger set comprising a plurality of print parameters and queuing actions, the subset including at least one print parameter and at least one queuing action, and, when applied, executing the subset on at least one computerized object, wherein the action tool is part of a set of action tools.

2. A method of outputting computerized objects, comprising:
customizing an action tool by linking a particular subset of a larger set comprising a plurality of print parameters and queuing actions to the action tool, the subset including at least one print parameter and at least one queuing action,
editing and resaving the customized action tool,
identifying a plurality of computerized objects to be printed,
selecting the action tool, and
applying the action tool to the identified computerized objects, wherein selecting an action tool includes selecting the action tool from a group of action tools, and applying the action tool comprises activating the action tool by selection of an icon on a computer screen using a single user command.

3. A computer system, comprising:
a plurality of objects stored in a memory of a first computer,
a plurality of print parameters, queuing actions and archiving actions stored in the memory, and
an action tool accessible from the first computer or a second computer, the action tool being customized and resaved to contain a subset of a larger set comprising a plurality of print parameters, queuing actions, and archiving actions, and, when applied, being configured to execute a subset including at least one of the plurality of print parameters, at least one of the plurality of queuing actions, and at least one of the plurality of archiving actions on a subset of the plurality of objects, wherein the action tool is selected from a group of action tools and is applied using a single user command.

* * * * *